(No Model.) 2 Sheets—Sheet 1.

F. M. ASHLEY.
APPARATUS FOR STERILIZING LIQUIDS.

No. 572,516. Patented Dec. 8, 1896.

(No Model.) 2 Sheets—Sheet 2.

F. M. ASHLEY.
APPARATUS FOR STERILIZING LIQUIDS.

No. 572,516. Patented Dec. 8, 1896.

Fig. 2.

WITNESSES:
Frank S. Ober
Abm Kofel

INVENTOR
Frank M. Ashley
by Lawyer & Edwards
ATTORNEYS.

UNITED STATES PATENT OFFICE.

FRANK M. ASHLEY, OF HAWTHORNE, NEW JERSEY.

APPARATUS FOR STERILIZING LIQUIDS.

SPECIFICATION forming part of Letters Patent No. 572,516, dated December 8, 1896.

Application filed March 21, 1895. Serial No. 542,572. (No model.)

*To all whom it may concern:*

Be it known that I, FRANK M. ASHLEY, a citizen of the United States, and a resident of Hawthorne, in the county of Passaic and State of New Jersey, have invented certain new and useful Improvements in Apparatus for Sterilizing Liquids, of which the following is a specification.

This invention relates to apparatus for sterilizing liquids, and has special reference to the sterilization of milk. Its object is to provide a simple and efficient apparatus for carrying out the inventions described in my applications for patent for apparatus for sterilizing milk heretofore filed.

The present invention possesses other features of novelty and utility, which will be hereinafter described, and particularly pointed out in the claims.

In the accompanying drawings, Figure 1 is a general plan of an apparatus for carrying out my invention. Fig. 2 is a general view of an apparatus for carrying out my invention in which compressed air is used for pressure.

In this apparatus the tanks A, B, C, and D, with the steam-boiler E, are the principal features. Tank A is connected with tank B by a pipe $a$ between the lower ends of each. This pipe contains a check-valve $a'$, preventing flow of milk from the bottom tank B, and pipe $b$ leads to tank C, wherein it is connected with a coil $c$, extending through the tank and connecting at its other end with a pipe $c'$, leading to the bottom of tank D. Pipe $b$ contains a check-valve $b'$, preventing flow from C to B. A thermometer $c^2$ and cut-off valve $c^3$ are placed in pipe $c'$. From the steam-boiler E pipe $e^7$ leads to tank C. By this tank C is kept filled with hot water up to the level of the water in the boiler. From the steam-chamber of the boiler a pipe $e'$ leads to the upper part of tank A. Another pipe $e^2$ leads to the upper part of tank B. This pipe contains a reducing-valve $e^3$, giving a lower pressure in tank B than in tank A. Pipe $e^4$ leads to the upper part of tank C, and pipe $e^5$ leads to the upper part of tank D and contains a reducing-valve $e^6$.

P is a steam-pump for maintaining a circulation of cold water through pipe $p$, containing a coil located inside of tank D. This pump also furnishes cold water to a cooling-tank $q$, containing a coil $q'$, through which milk flows, as will be hereinafter described. The coil in cooler $q$ is connected by pipe $g$ with a tank D, which conducts sterilized milk to the coil, and with a pipe $g'$, which leads the cooled milk into a reservoir K, whence it may be drawn for use.

The operation of sterilizing milk in the use of this apparatus may be described as follows: Tank A first receives the milk, and it is filled up about three-fourths full to leave a space above the surface of the milk for steam, which enters through pipe $e'$. From this tank the milk flows through pipe $a$ into tank B and the level in the lower tank is raised above that in tank A by steam-pressure in the tank. Steam is also admitted to tank B above the milk and the pressure therein is regulated by the reducing-valve $e^3$, so that it will be less than the pressure in tank A, and will therefore insure a movement of the milk from A to B so long as there is any milk in the tank A. The milk receives a little heat from the steam in tanks A and B, but from tank B the milk leads through coil $c$ in the tank C. The coil is located in the steam-chamber above the hot water and is there subjected to a heat sufficient to destroy any bacteria or germs which the milk may contain. As the milk passes the thermometer $c^2$ its temperature may be observed and the heat in tank C regulated accordingly. Pressure in tank B forces the milk into tank D, which it enters at a somewhat less temperature than it possesses in tank C, but still hot enough to boil if the pressure were removed. Pressure, however, is retained by introducing steam above the milk in the chamber D through pipe $e^5$. The pressure is less than that in tank B, but is yet sufficient to prevent ebullition of the milk. In this tank is located a cooling-coil, which gradually reduces the temperature of the milk below 212°, at which temperature the milk may be drawn off and sealed without having been agitated during the entire process of sterilization.

The hot water located in the lower portion of tank C and its connection with the water of the boiler serve for the purpose of a steam-trap for the tank, for the steam, which condenses above the water, has a ready outlet and makes it possible to keep up the desired temperature in the upper part of the tank.

A possible objection to the use of the apparatus hereinbefore described is the contact of steam with the milk, because the water, which forms by the condensation of the steam, joins the milk and dilutes it to a certain extent. To overcome this objection, I have devised the apparatus shown in Fig. 2. In this apparatus the same four tanks A, B, C, and D are used, also the same canning device F. The pump, however, is constructed to force air as well as water, or two separate pumps may be used. As shown, the air-pump draws air from a chamber $i$ and forces it through a reservoir R and a coil S, located above the boiler. The coil is subjected to steam heat, and the air passing through it from the pump becomes highly heated, and thence is led in exactly the same manner as described in connection with Fig. 1 and the tanks A, B, and D. The air-chamber $i$ contains water, through which atmospheric air entering the pipe $i'$ is drawn. The water cleanses it of impurities, thus preventing contamination of the milk when the air makes contact with it in the tanks. Steam is used, as before, in the tank C, because higher temperatures are more easily attained with it than with air.

Having thus described my invention, I claim—

1. The herein-described apparatus for sterilizing milk or other liquids comprising a receptacle into which the liquid is forced, means for supplying pressure to the liquid in said chamber, a second chamber provided with a coil and connections between the coil and the first chamber with means for heating the coil, a third chamber with connections between said chamber and the second chamber, and means for keeping the liquid in said third chamber under pressure with means for cooling it in said chamber while under pressure; substantially as described.

2. The herein-described apparatus for sterilizing milk or other liquids comprising a receptacle as A, a source of steam supply, a second receptacle as B with a liquid-conduit between said receptacles, connections between the source of steam supply and both said receptacles for maintaining pressure upon the liquid therein, a heating-chamber in connection with the second liquid-receptacle with means for supplying heat thereto for heating the liquid, and a cooling-chamber D in connection with the heating-chamber, and connections between said cooling-chamber and the source of steam supply whereby the liquid is cooled under steam-pressure; substantially as described.

3. In the herein-described apparatus, the receptacles A B, with connections between the same, a source of steam supply and connections between the same and both said receptacles, a third receptacle C provided with a coil in connection with the receptacle B, the body of said receptacle C being also connected with the source of steam supply whereby the liquid in the coil is heated, a fourth receptacle as D with connections between it and the coil in the third receptacle, with connections between said receptacle D and the source of steam supply, and a cooling-coil arranged in said receptacle D; substantially as described.

Signed at New York, in the county of New York and State of New York, this 16th day of March, A. D. 1895.

FRANK M. ASHLEY.

Witnesses:
C. V. EDWARDS,
ABM. KOPEL.